United States Patent
Ruiz Floriach et al.

(10) Patent No.: US 7,450,612 B2
(45) Date of Patent: Nov. 11, 2008

(54) PACKETIZATION OF LAYERED MEDIA BITSTREAMS

(75) Inventors: Carles Ruiz Floriach, Mataro (ES); Yingwei Chen, Briarcliff Manor, NY (US)

(73) Assignee: Koninklijke Electronics N.V., Eindhoven (NL)

( * ) Notice: Subject to any disclaimer, the term of this patent is extended or adjusted under 35 U.S.C. 154(b) by 600 days.

(21) Appl. No.: 10/537,134

(22) PCT Filed: Nov. 28, 2003

(86) PCT No.: PCT/IB03/05505

§ 371 (c)(1),
(2), (4) Date: Jun. 2, 2005

(87) PCT Pub. No.: WO2004/051959

PCT Pub. Date: Jun. 17, 2004

(65) Prior Publication Data

US 2006/0056455 A1    Mar. 16, 2006

Related U.S. Application Data

(60) Provisional application No. 60/430,914, filed on Dec. 4, 2002.

(51) Int. Cl.
*H04J 3/24* (2006.01)
*H04J 3/00* (2006.01)

(52) U.S. Cl. .................... 370/473; 370/474; 370/476

(58) Field of Classification Search ............ 370/395.64, 370/473
See application file for complete search history.

(56) References Cited

U.S. PATENT DOCUMENTS

| 5,742,599 | A | * | 4/1998 | Lin et al. | 370/395.65 |
| 6,400,720 | B1 | | 6/2002 | Ovadia | 370/395.64 |
| 2001/0038746 | A1 | * | 11/2001 | Hughes et al. | 386/123 |

(Continued)

FOREIGN PATENT DOCUMENTS

CA    2009237    8/1990

(Continued)

OTHER PUBLICATIONS

Cuenca, et al., Packing Scheme for Layered Coding MPEG-2 Video Transmissions over ATM Based Networks, IEEE ATM Workshop 1997 Proceedings May 25-28, 1997, pp. 168-177.*

(Continued)

*Primary Examiner*—Steven H. D Nguyen
*Assistant Examiner*—Christopher M Crutchfiel

(57) ABSTRACT

Network streams and a method for encapsulating media packets having data therein into the network streams. The network streams includes a base layer stream and an enhancement layer stream. Base-layer media packets are encapsulated into the network packets of the base layer stream, wherein each network packet of the base layer stream includes one, and no more than one, corresponding base-layer media packet. Enhancement-layer media packets are encapsulated into the network packets of the enhancement layer stream, wherein a first portion and a second remaining portion of any enhancement-layer media packet may be respectively included in successive network packets of the enhancement layer stream in order to have each network packet of the enhancement layer stream filled to a constant number of bits that does not exceed a maximum number of bits. The media packets are, but not limited to, video packets or audio packets.

32 Claims, 4 Drawing Sheets

U.S. PATENT DOCUMENTS

| | | | |
|---|---|---|---|
| 2002/0009232 A1 | 1/2002 | Sodagar | 382/232 |
| 2002/0021761 A1 | 2/2002 | Zhang | 375/240.27 |
| 2002/0150158 A1* | 10/2002 | Wu et al. | 375/240.12 |
| 2005/0041745 A1* | 2/2005 | Zhang et al. | 375/240.27 |

FOREIGN PATENT DOCUMENTS

| | | | |
|---|---|---|---|
| EP | 0996291 A1 | 4/2000 | |
| EP | 1067740 A1 | 1/2001 | |

OTHER PUBLICATIONS

Worall, et al., IEE Proceedings of Communication, vol 148, No. 4, Aug. 2001.*

RFC 1889, Schulzrinne, et al, Request for Comments: 1889, Jan. 1996.*

* cited by examiner

PACKETIZATION OF LAYERED MEDIA BITSTREAMS

CROSS REFERENCE TO RELATED APPLICATION

This application claims the benefit of U.S. provisional application Ser. No. 60/430,914 filed Dec. 4, 2002, which is incorporated herein by reference.

The present invention relates to network streams and a method for encapsulating media packets having coded media data therein into the network streams With network streams having media data therein, it is difficult to achieve both bandwidth efficiency and protection against data losses. Thus, there is a need for enhancing both bandwidth efficiency and protection against data losses.

The present invention provides a method for encapsulating media packets having data therein into network streams of media data, comprising:

providing base-layer media packets corresponding to a base layer stream of the network streams, the base layer stream comprising network packets;

providing enhancement-layer media packets corresponding to an enhancement layer stream of the network streams, the enhancement layer stream comprising network packets, wherein a one-to-one correspondence exists between the base-layer media packets and the enhancement-layer media packets;

encapsulating the base-layer media packets into the network packets of the base layer stream, wherein each network packet of the base layer stream includes a header field, and wherein each network packet of the base layer stream includes one, and no more than one, corresponding base-layer media packet; and encapsulating the enhancement-layer media packets into the network packets of the enhancement layer stream, wherein each network packet of the enhancement layer stream includes a header field, wherein a first portion and a second remaining portion of any enhancement-layer media packet may be respectively included in successive network packets of the enhancement layer stream in order to have each network packet of the enhancement layer stream filled to a constant number of bits NE that does not exceed a maximum number of bits NEMAX, subject to the last network packet of the enhancement layer stream being required to be filled to only as many bits as is necessary to include the last enhancement-layer media packet of the enhancement-layer media packets.

The present invention provides network streams of media data, comprising: a base layer stream comprising network packets, wherein each network packet of the base layer stream includes a header field, and wherein each network packet of the base layer stream includes one, and no more than one, corresponding base-layer media packet having data therein; and an enhancement layer stream comprising network packets, wherein each network packet of the enhancement layer stream includes a header field, wherein the network packets of the enhancement layer stream include enhancement-layer media packets having data therein, wherein a one-to-one correspondence exists between the base-layer media packets and the enhancement-layer media packets, wherein a first portion and a second remaining portion of any enhancement-layer media packet may be respectively included in successive network packets of the enhancement layer stream in order to have each network packet of the enhancement layer stream filled to a constant number of bits NE that does not exceed a maximum number of bits NEMAX, subject to the last network packet of the enhancement layer stream being required to be filled to only as many bits as is necessary to include the last enhancement-layer media packet of the enhancement-layer media packets.

The present invention enhances both bandwidth efficiency and protection against data losses for network streams having coded media data therein.

Figure 1A:
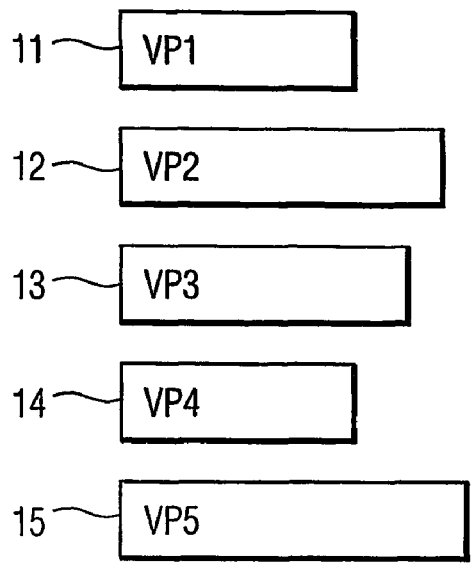
FIGS. 1A-1B depict video packets and network packets of a network stream, the network packets including the video packets such that the network packets have a fixed number of bits, according to the present invention.

The embodiments are described herein relate to packets containing coded video information. However these video embodiments are not intended to be limiting, and the scope of the present invention more generally includes packets containing coded media information, relating to any media such as video, audio, etc.

Packetization for video streaming refers to the process of encapsulating video packets of coded video information into network packets in order to do the video streaming. The video stream (or video bitstream) may be transmitted from a sender using, inter alia, Real-Time Protocol (RTP) network packets. The terms "stream" and "bitstream" have the same meaning herein and may be used interchangeably. The Real-Time Protocol was published as Request For Comments (RFC) 1889 by the Internet Engineering Task Force (IETF).

The RTP network packet includes a RTP header and a payload that includes coded video information obtained from the video packets. The RTP header carries the timing and sequence information of the network packet.

The video packets comprise coded video information and a resynchronization marker, typically at the beginning of each video packet. The resynchronization marker enables a decoder to resynchronize degraded video packets with the video packet bitstream when some of the coded video information is lost in the transmission process. Video packets often have variable size (i.e., variable length or variable number of bits).

Different network packetization schemes may be used, and depending on the stream characteristics and the network conditions, the different network packetization schemes have different levels of performance. Performance includes, inter alia, the following performance elements: utilized bandwidth for network packet transmission, video quality in conjunction with loss of network packets, and probability of loss of network packets. There is a tradeoff between said performance elements. Recommendations for Single Layer Video on how to packetize video information are given in RFC (Request for Comments) 3016 of the Internet Engineering Task Force (IETF), entitled "RTP Payload Format for MPEG-4 Audio/Visual Streams". These recommendations refer to coded MPEG-4 video in general; however, no specific packetization methods are provided for Layered Video (i.e., network streams of video network packets).

Layered Video is a specific kind of coded video that comprises a plurality of layers, in contrast with Single Layer Video. The most important layer in Layered Video is called a "Base Layer", because the Base Layer includes essential information to decode the network video stream at a certain base quality. The remaining layers are called "Enhancement Layers" and add video quality to the decoded video stream. There are various encoding methods for obtaining layered streams such as, inter alia, using scalable coding or data partitioning. The present invention applies to any kind of layered stream regardless of the encoding method. Thus, the networks streams of the present invention includes a base layer stream and one or more enhancement layer streams.

The embodiments described herein include packetization strategies for Single Layer Video and Layered Video. Packetization strategies for Single Layer Video include a bandwidth-efficient packetization strategy (FIGS. 1A-1B) and a robust packetization strategy (FIGS. 2A-2B). Packetization strategies for Layered Video include a robust packetization strategy for the Base Layer, and a bandwidth-efficient packetization strategy for the Enhancement Layer (FIGS. 3A-3D).

Figure 1B:
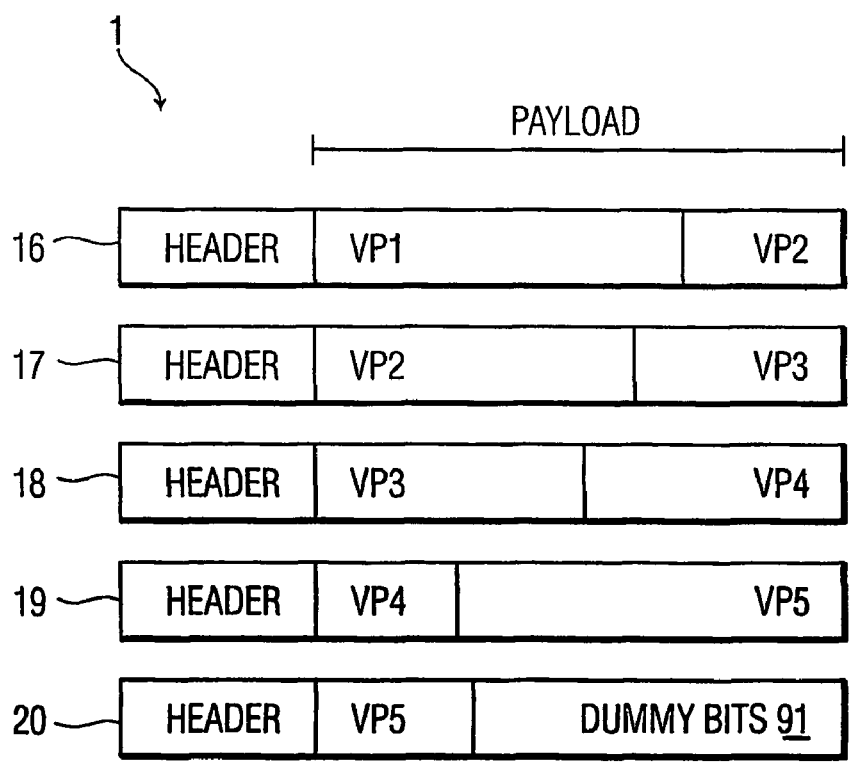
Figure 2A:
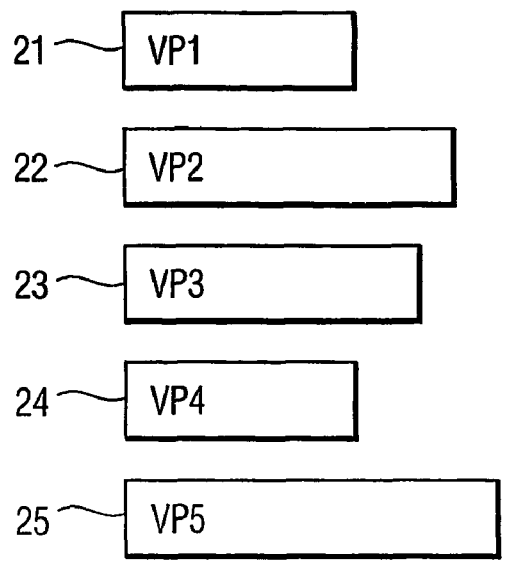
FIGS. 2A-2B depict video packets and network packets of a network stream, the network packets including the video packets such that there is a one-to-one correspondence between the network packets and the video packets, according to the present invention.
Figure 2B:
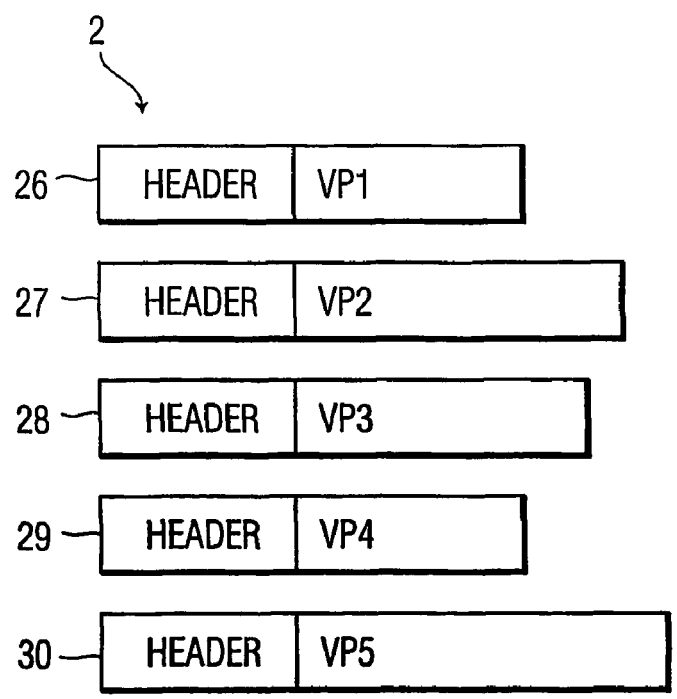

FIGS. 1A-1B (denoted collectively as "FIG. 1") depict video packets 11-15 and ordered network packets 16-20 of a network stream 1, according to the present invention. The video packets 11-15 may be variable length packets or constant length packets. The video packets 11, 12, 13, 14, and 15 have video content VP1, VP2, VP3, VP4, and VP5, respectively. The video content VP1, VP2, VP3, VP4, and VP5 may be in a compressed format (e.g., MPEG-4) or in an uncompressed format. The network stream 1 is a Single Layer Video stream that comprises the network packets 16-20 in the order: 16, 17, 18, 19, and 20. The video content VP1-VP5 of the video packets 11-15 have been encapsulated into the network packets 16-20 as shown. Each network packet of network packets 16-20 comprises a header field and a payload field. The header field may have a constant length or a variable length. The payload field of each network packet includes a portion of video content VP1-VP5 such that network packets 16-20 each have a same number of bits NB (i.e., a constant number of bits or a constant payload length) that does not exceed a maximum number of bits NBMAX. Thus, both NB=NBMAX and NB<NBMAX are within the scope of the present invention. The network packet 20 is the last packet of the network stream 1 and includes a field 91 of dummy bits beyond the last video content VP5 of video packet 15, in order to maintain the constant number of bits NB for the network packet 20. Alternatively, the network packet 20 could be truncated so as to eliminate the field 91 of dummy bits, such that the network packet 20 would have fewer bits than the constant NB bits. Thus, although network packets 16-19 each have the constant number of bits NB, the last network packet 20 of the network stream 1 is required to be filled to only as many bits as is necessary to include the last video content VP5 of video packet 15. In other words, the presence and absence of the field 91 of dummy bits are both within the scope of the present invention.

The packing of the video content VP1-VP5 into the network packets 16-20 in FIG. 1B is called a "bandwidth-efficient" packing scheme that does not take into account the boundaries between VP1 and VP2, VP2 and VP3, VP3 and VP4, and VP4 and VP5. This bandwidth-efficient packing scheme provides good performance in terms of utilized bandwidth. However, some of video packets 11-15 have video content encapsulated into more than one network packet. Thus, VP2 is encapsulated into network packets 16 and 17, VP3 is encapsulated into network packets 17 and 18, VP4 is encapsulated into network packets 18 and 19, and VP5 is encapsulated into network packets 19 and 20. Additionally, each network packet may include the video content of more than one video packet. Thus, network packet 16 includes content from VP1 and VP2, network packet 17 includes content from VP2 and VP3, network packet 18 includes content from VP3 and VP4, network packet 19 includes content from VP4 and VP5, and network packet 20 includes content from at least VP5.

FIGS. 2A-2B (denoted collectively as "FIG. 2") depict video packets 21-25, and ordered network packets 26-30 of a network stream 2, according to the present invention. The video packets 21-25 may be variable length packets or constant length packets. The video packets 21, 22, 23, 24, and 25 have video content VP1, VP2, VP3, VP4, and VP5, respectively. The video content VP1, VP2, VP3, VP4, and VP5 may be in a compressed format (e.g., MPEG-4) or in an uncompressed format. The network stream 2 is a Single Layer Video stream that comprises the network packets 26-30 in the order: 26, 27, 28, 29, and 30. Each network packet of network packets 26-30 comprises a header field and a payload field. The header field may have a constant length or a variable length. The payload field of each network packet includes a portion of video content VP1-VP5 such that network packets 26-30 each have a variable number of bits (i.e., a variable payload length) that does not exceed a maximum number of bits. The video content VP1-VP5 of the video packets 21-25 are respectively encapsulated into the network packets 26-30 in accordance with a one-to-one correspondence as shown. Thus the packing of the video content VP1-VP5 into the network packets 16-20 in FIG. 1B is called a "packet protective" packing scheme that provides good performance against packet losses (i.e., "robustness"), since if a network packet is lost or corrupted during network packet transmission, only one video packet will be lost and the remaining video packets will be decoded correctly. In contrast, in the bandwidth-efficient packetization scheme of FIGS. 1A-1B, resynchronization markers from more than one video packet could be lost when a network packet is lost, and therefore more than one video packet may not be decoded correctly. Therefore, there is a tradeoff between utilized bandwidth and robustness for the different packetization schemes of FIGS. 1 and 2.

FIGS. 3A-3D (denoted collectively as "FIG. 3") depict encapsulation of video packets into network packets of video stream, in accordance with embodiments of the present invention. The video streams comprise a base layer stream 3 and an enhancement layer stream 4. The base layer stream 3 is encapsulated with base-layer video packets in accordance with a packet protective packing scheme similar that of FIG. 2B discussed supra. The enhancement layer stream 4 is encapsulated with enhancement-layer video packets in accordance with a bandwidth-efficient packing scheme similar that of FIG. 1B discussed supra.

Figure 3A:
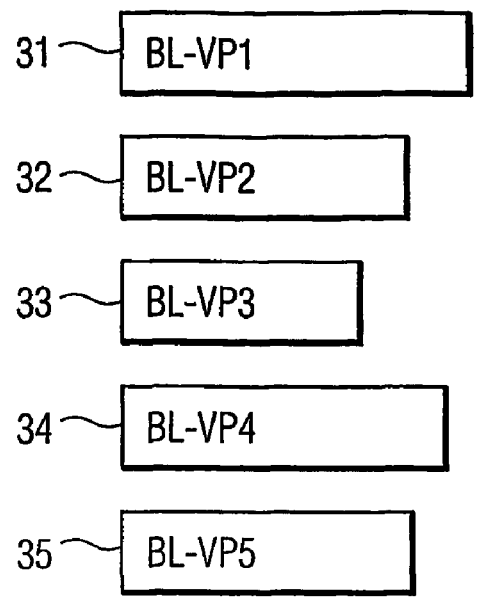
FIGS. 3A-3D depict encapsulation of base-layer video packets and enhancement-layer video packets into network packets of a network streams, in accordance with embodiments of the present invention.
Figure 3B:
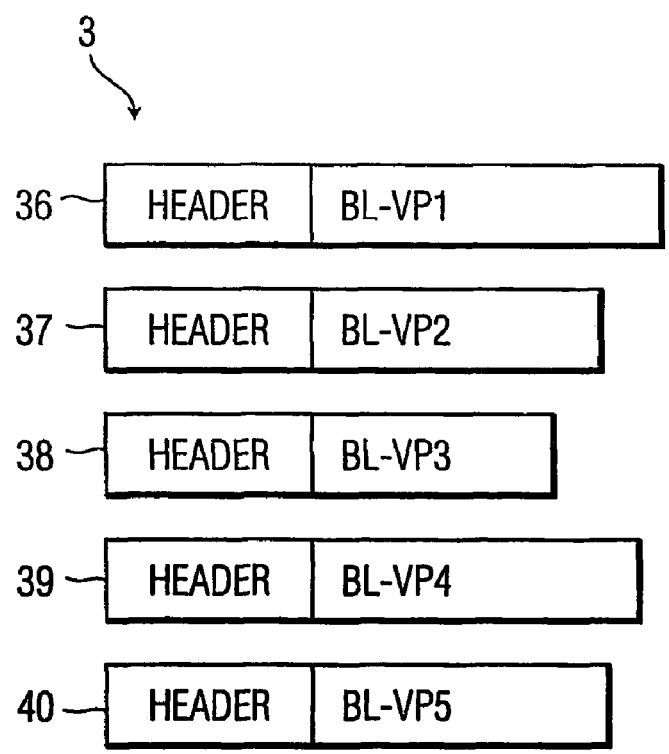

FIG. 3A depicts base-layer video packets 31, 32, 33, 34, and 35 having video content BL-VP1, BL-VP2, BL-VP3, BL-VP4, and BL-VP5, respectively. The base-layer video packets 31, 32, 33, 34, and 35 may be variable length packets or constant length packets. The video content BL-VP1, BL-VP2, BL-VP3, BL-VP4, and BL-VP5 maybe in a compressed format (e.g., MPEG-4) or in an uncompressed format. FIG. 3B depicts base-layer ordered network packets 36, 37, 38, 39, and 40 of the base layer stream 3. The video content BL-VP1, BL-VP2, BL-VP3, BL-VP4, and BL-VP5 of the base-layer video packets 31, 32, 33, 34, and 35 have been encapsulated into the base-layer network packets 36, 37, 15 38, 39, and 40, in accordance with a packet protective packing scheme. Each base-layer network packet of the base-layer network packets 36-40 comprises a header field and a payload field. The header field may have a constant length or a variable length. The payload field of each base-layer network packet includes a portion of video content BL-VP1, BL-VP2, BL-VP3, BL- VP4, and BL-VP5, such that the base-layer network packets 36-40 each have a variable number of bits (i.e., a variable payload length) that does not exceed a maximum number of bits. The video content BL-VP1, BL-VP2,13L-VP3, BL-VP4, and BL-VP5 of the base-layer video packets 31-35 are respectively encapsulated into the base-layer network packets 36-40 in accordance with a one-to-one correspondence as shown. The use of the packet protective packing scheme that provides robustness (i.e., good performance against packet losses) is important for the base layer stream 3, because the base layer stream 3 includes essential information to decode the network video stream at a certain base quality and thus provides a complete version of the video content even though this complete version may be characterized by low video quality.

Figure 3C:
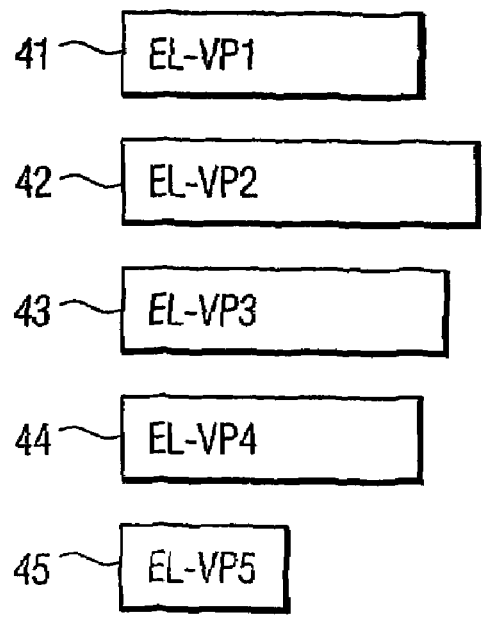
Figure 3D:
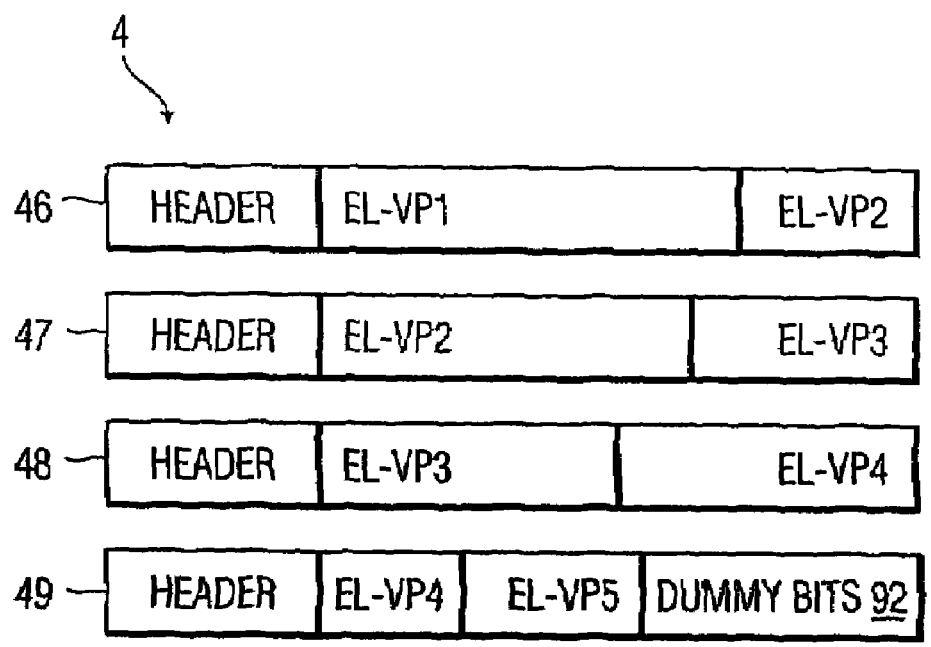

FIG. 3C depicts enhancement-layer video packets 41,42, 43,44, and 45 having video content EL-VP1, EL-VP2, EL-VP3, EL-VP4, and EL-VP5, respectively. The enhancement-layer video packets 41, 42, 43, 44, and 45 may be variable length packets or constant length packets. The video content EL-VP1, EL-VP2, EL-VP3, EL-VP4, and EL-VP5 may be in a compressed format (e.g., MPEG-4) or in an uncompressed format. FIG. 3D depicts enhancement-layer ordered network packets 46, 47, 48, and 49 of the enhancement layer stream 4. The video content EL-VP1, EL-VP2, EL-VP3, EL-VP4, and EL-VP5 of the enhancement-layer video packets 41, 42, 43, 44, and 45 have been encapsulated into the enhancement-layer network packets 46,47, 48, and 49 in accordance with a bandwidth-efficient packing scheme. Each enhancement-layer network packet of the enhancement-layer network packets 46-49 comprises a header field and a payload field. The header field may have a constant length or a variable length. If the header field of the base-layer network packet has a constant length L1 and the header field of the enhancement-layer network packet has a second constant length L2, then both L1=L2 and L1' L2 are within the scope of the present invention. The payload field of each enhancement-layer network packet includes a portion of video content EL-VP1, EL-VP2, EL-VP3, EL-VP4, and EL-VP5, such that enhancement-layer network packets 46-49 each have a same number of bits NE (i.e., a constant number of bits or a constant payload length) that does not exceed a maximum number of bits NEMAX. Thus, both NE=NEMAX and NE<NEMAX are within the scope of the present invention. The enhancement-layer network packet 49 is the last packet of the enhancement layer stream 4 and includes a field 92 of dummy bits beyond the last video content EL-VP5 of enhancement-layer video packet 45, in order to maintain the constant number of bits NE for the enhancement-layer network packet 49. Alternatively, the enhancement-layer network packet 49 could be truncated so as to eliminate the field 92 of dummy bits, such that the enhancement-layer network packet 49 would have fewer bits than the constant NE bits. Thus, although network packets 46-48 each have the constant number of bits NE, the last enhancement-layer network packet 49 of the enhancement layer stream 4 is required to be filled to only as many bits as is necessary to include the last video content EL-VP5 of video packet 40. In other words, the presence and absence of the field 92 of dummy bits are both within the scope of the present invention.

In FIG. 3D, each network packet may include the video content of more than one video packet Network packet 46 includes content from EL-VP1 and EL-VP2, network packet 47 includes content from EL-VP2 and EL-VP3, network packet 48 includes content from EL-VP3 and EL-VP4, and network packet 49 includes content from EL-VP4 and EL-VP5. Nonetheless, the bandwidth-efficient packing scheme of FIG. 4D provides good performance in terms of utilized bandwidth. The reduced protection against packet losses of the bandwidth-efficient packing scheme of FIG. 4D is acceptable, because the enhancement layer stream 4 does not have the essential information needed for display purposes that the base layer stream 3 has.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method for encapsulating media packets having data therein into network streams of media data, comprising:
   providing base-layer media packets corresponding to a base layer stream of the network streams, the base layer stream comprising network packets;
   providing enhancement-layer media packets corresponding to an enhancement layer stream of the network streams, the enhancement layer stream comprising network packets, wherein a one-to-one correspondence exists between the base-layer media packets and the enhancement-layer media packets;
   encapsulating the base-layer media packets into the network packets of the base layer stream, wherein each network packet of the base layer stream includes a header field, and wherein each network packet of the base layer stream includes one, and no more than one, corresponding base-layer media packet; and
   encapsulating the enhancement-layer media packets into the network packets of the enhancement layer stream, wherein each network packet of the enhancement layer stream includes a header field, wherein a first portion and a second remaining portion of any enhancement-layer media packet may be respectively included in successive network packets of the enhancement layer stream in order to have each network packet of the enhancement layer stream filled to a constant number of bits NE that does not exceed a maximum number of bits NEMAX, subject to the last network packet of the enhancement layer stream being required to be filled to only as many bits as is necessary to include the last enhancement-layer media packet of the enhancement-layer media packets.

2. The method of claim 1, wherein a packet structure of the network streams conforms to the Real-Time Protocol (RTP) standard published as Request For Comments (RFC) 1889 by the Internet Engineering Task Force (IETF).

3. The method of claim 1, wherein NE=NEMAX.

4. The method of claim 1, wherein NE<NEMAX.

5. The method of claim 1, wherein the base-layer media packets are base-layer video packets, wherein the enhancement-layer media packets are enhancement-layer video packets, and wherein the media data is video data.

6. The method of claim 1, wherein the base-layer media packets are base-layer audio packets, wherein the enhancement-layer media packets are enhancement-layer audio packets, and wherein the media data is audio data.

7. The method of claim 1, wherein data content of the base-layer media packets is in a compressed format, wherein data content of the enhancement-layer media packets is in a compressed format, and wherein the media data is in a compressed format.

8. The method of claim 1, wherein data content of the base-layer media packets is in an uncompressed format, wherein data content of the enhancement-layer media packets is in an uncompressed format, and wherein the media data is in an uncompressed format.

9. The method of claim 1, wherein the base-layer media packets and the enhancement-layer media packets are variable length packets.

10. The method of claim 1, wherein the base-layer media packets and the enhancement-layer media packets are constant length packets.

11. The method of claim 1, wherein the base-layer media packets are variable length packets, and wherein the enhancement-layer media packets are constant length packets.

12. The method of claim 1, wherein the base-layer media packets are constant length packets, and wherein the enhancement-layer media packets are variable length packets.

13. The method of claim 1, wherein the header field included within each network packet of the base layer stream has a variable length, and wherein the header field included within each network packet of the enhancement layer stream has a variable length.

14. The method of claim 1, wherein the header field included within each network packet of the base layer stream has a first constant length, and wherein the header field included within each network packet of the enhancement layer stream has a second constant length.

15. The method of claim 14, wherein the first constant length equals the second constant length.

16. The method of claim 14, wherein the first constant length differs from the second constant length.

17. Network streams of media data, comprising:
a base layer stream comprising network packets, wherein each network packet of the base layer stream includes a header field, and wherein each network packet of the base layer stream includes one, and no more than one, corresponding base-layer media packet having data therein; and
an enhancement layer stream comprising network packets, wherein each network packet of the enhancement layer stream includes a header field, wherein the network packets of the enhancement layer stream include enhancement-layer media packets having data therein, wherein a one-to-one correspondence exists between the base-layer media packets and the enhancement-layer media packets, wherein a first portion and a second remaining portion of any enhancement-layer media packet may be respectively included in successive network packets of the enhancement layer stream in order to have each network packet of the enhancement layer stream filled to a constant number of bits NE that does not exceed a maximum number of bits NEMAX, subject to the last network packet of the enhancement layer stream being required to be filled to only as many bits as is necessary to include the last enhancement-layer media packet of the enhancement-layer media packets.

18. The network streams of claim 17, wherein a packet structure of the network streams conforms to the Real-Time Protocol (RTP) standard published as Request For Comments (RFC) 1889 by the Internet Engineering Task Force (IETF).

19. The network streams of claim 17, wherein NE=NEMAX.

20. The network streams of claim 17, wherein NE<NEMAX.

21. The network streams of claim 17, wherein the base-layer media packets are base-layer video packets, wherein the enhancement-layer media packets are enhancement-layer video packets, and wherein the media data is video data.

22. The network streams of claim 17, wherein the base-layer media packets are base-layer audio packets, wherein the enhancement-layer media packets are enhancement-layer audio packets, and wherein the media data is audio data.

23. The network streams of claim 17, wherein data content of the base-layer media packets is in a compressed format, wherein the content of the enhancement-layer media packets is in a compressed format, and wherein the media data is in a compressed format.

24. The network streams of claim 17, wherein data content of the base-layer media packets is in an uncompressed format, wherein the content of the enhancement-layer media packets is in an uncompressed format, and wherein the media data is in an uncompressed format.

25. The network streams of claim 17, wherein the base-layer media packets and the enhancement-layer media packets are variable length packets.

26. The network streams of claim 17, wherein the base-layer media packets and the enhancement-layer media packets are constant length packets.

27. The network streams of claim 17, wherein the base-layer media packets are variable length packets, and wherein the enhancement-layer media packets are constant length packets.

28. The network streams of claim 17, wherein the base-layer media packets are constant length packets, and wherein the enhancement-layer media packets are variable length packets.

29. The network streams of claim 17, wherein the header field included within each network packet of the base layer stream has a variable length, and wherein the header field included within each network packet of the enhancement layer stream has a variable length.

30. The network streams of claim 17, wherein the header field included within each network packet of the base layer stream has a first constant length, and wherein the header field included within each network packet of the enhancement layer stream has a second constant length.

31. The network streams of claim 30, wherein the first constant length equals the second constant length.

32. The network streams of claim 30, wherein the first constant length differs from the second constant length.

* * * * *